United States Patent [19]

Tatem, Jr. et al.

[11] 3,893,297

[45] July 8, 1975

[54] BYPASS AUGMENTATION BURNER ARRANGEMENT FOR A GAS TURBINE ENGINE

[75] Inventors: Bemis Caldwell Tatem, Jr.; Robert Gordon Stabrylla, both of Cincinnati, Ohio

[73] Assignee: General Electric Company, Lynn, Mass.

[22] Filed: Jan. 2, 1974

[21] Appl. No.: 429,758

[52] U.S. Cl. ............... 60/224; 60/39.65; 60/39.66; 60/266
[51] Int. Cl. ............................................. F02k 3/02
[58] Field of Search...... 60/224, 226 R, 226 A, 262, 60/39.66, 266

[56] References Cited
UNITED STATES PATENTS
3,528,250  9/1970  Johnson ............................... 60/262
3,800,527  4/1974  Marshall et al. ....................... 60/224

*Primary Examiner*—William L. Freeh
*Assistant Examiner*—Robert E. Garrett
*Attorney, Agent, or Firm*—James W. Johnson, Jr.; Derek P. Lawrence

[57] ABSTRACT

A bypass augmentation burner and strut arrangement is provided for a gas turbine engine of the bypass type wherein the struts are located downstream of the bypass burner and receive impingement of a cooling airflow directly from a plurality of cold chutes interleaved between a plurality of hot chutes about the convoluted trailing edge of the bypass burner.

12 Claims, 5 Drawing Figures

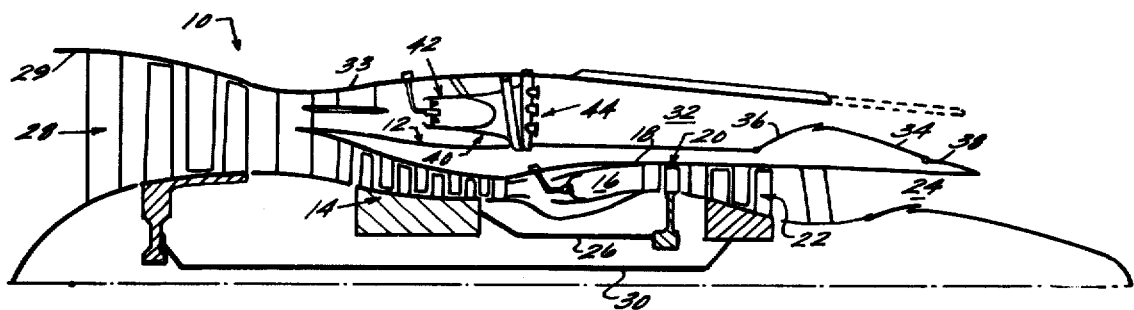
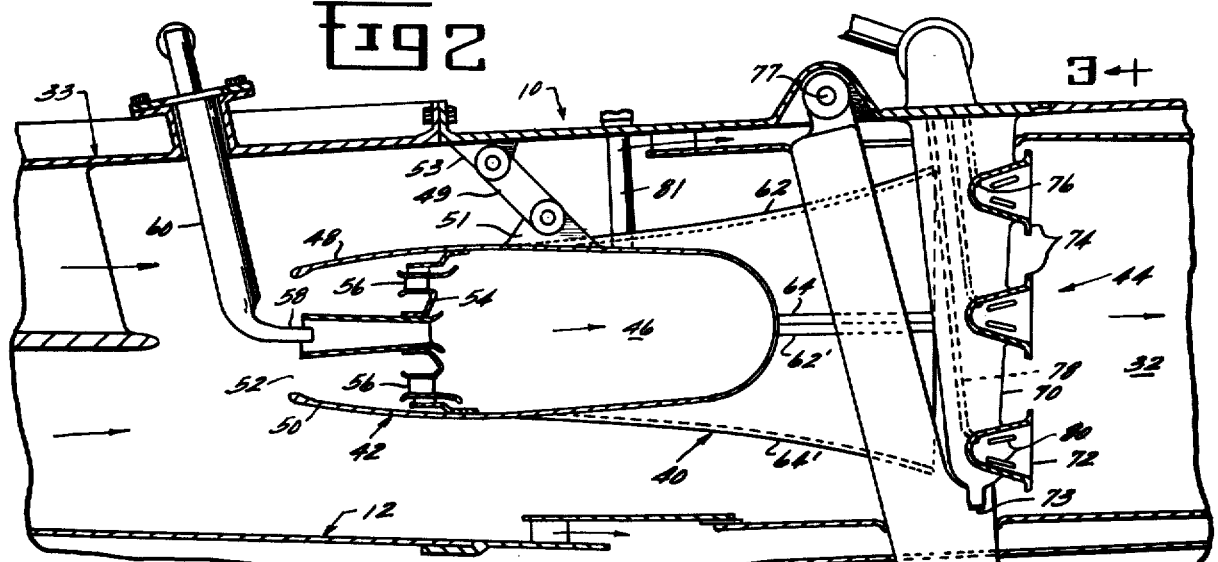
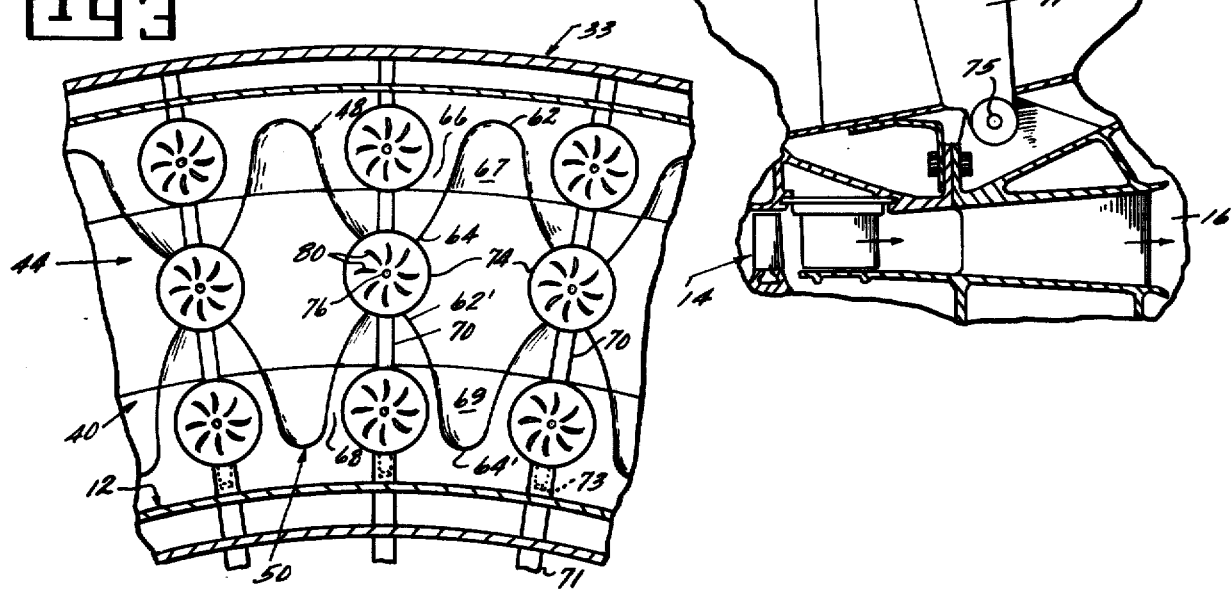

BYPASS AUGMENTATION BURNER ARRANGEMENT FOR A GAS TURBINE ENGINE

BACKGROUND OF THE INVENTION

This invention relates to a bypass augmentation burner arrangement for a gas turbine engine and, more particularly, to a bypass augmentation burner arrangement for a gas turbine engine of the bypass type whereby spaced apart struts are provided in downstream relation to the bypass burner.

In a bypass gas turbine engine, a portion of the air entering the engine is bypassed around the compressor, the combustion stage and the turbine of the gas turbine engine. The bypassed air may be ram induction air, in which case there would be no additional thrust added to the thrust produced within the combustion stage portion of the engine. The bypass gas turbine engine may alternatively include a fan section wherein a portion of the airflow through the fan is directed to the bypass air passage. Such engines are well known to the art and commonly referred to as turbofan engines. The invention shall hereinafter be described in relation to a bypass gas turbine engine of the turbofan type, although it is understood that the broad scope of the invention is applicable to all bypass gas turbine engines.

Recently, it has been suggested that bypass augmentation burners be included in the bypass air passages of turbofan engines in order to provide additional thrust to the thrust already produced within the central combustion stage of the engine. Heretofore in gas turbine engines of the bypass type, it has been difficult, if not impossible, to station supporting struts in the bypass duct at a location downstream of the burner due to the high heat of the exhaust stream exiting from the burner. This high heat often damages the supporting struts and considerably shortens their useful lifetime. Locating the supporting struts upstream of the augmentation burner, although eliminating the danger of overheating or burning the struts incurs the disadvantage of increasing the overhanging moment between the bypass duct and core engine. This in turn reduces the overall structural integrity of the engine and may be the cause of increased vibrations encountered within the core engine.

Therefore, it is a primary object of this invention to provide a bypass burner and supporting strut arrangement for a bypass gas turbine engine whereby the supporting struts in the bypass duct may be located downstream of the bypass burner in a manner which does not permit substantial impingement of the hot gases of combustion exiting from the bypass burner on to the supporting struts.

SUMMARY OF THE INVENTION

This and other objects and advantages will become clearly understood from the following detailed description and drawings, all of which are intended to be representative of, rather than in any way limiting on, the scope of invention. A gas turbine engine of the bypass type includes a generally cylindrical inner casing enclosing a compressor, combustor and turbine, all of which are arranged in serial flow relation. A generally cylindrical outer casing is spaced apart and concentric to the inner casing so as to define a generally annular bypass duct therebetween. A bypass augmentation burner is provided within the bypass duct and provides additional thrust augmentation to the gas turbine engine wherein the downstream end of the bypass burner is convoluted to alternatively define hot and cold chutes. A plurality of circumferentially spaced apart struts extend radially between the inner and outer casings so as to receive impingement of a cooling airflow directly from the cold chutes.

DESCRIPTION OF THE DRAWINGS

While the specification concludes with claims distinctly claiming and pointing out the invention described herein, it is believed that the invention will be more readily understood by reference to the discussion below and the accompanying drawings in which:

FIG. 1 is a cross-sectional view of a bypass gas turbine engine of the turbofan type having the bypass augmentation burner arrangement of this invention.

FIG. 2 is an enlarged cross-sectional view of the bypass augmentation burner of FIG. 1.

FIG. 3 is a cross-sectional view across the lines 3—3 in FIG. 2.

DESCRIPTION OF THE PREFERRED EMBODIMENT

Figure 4:
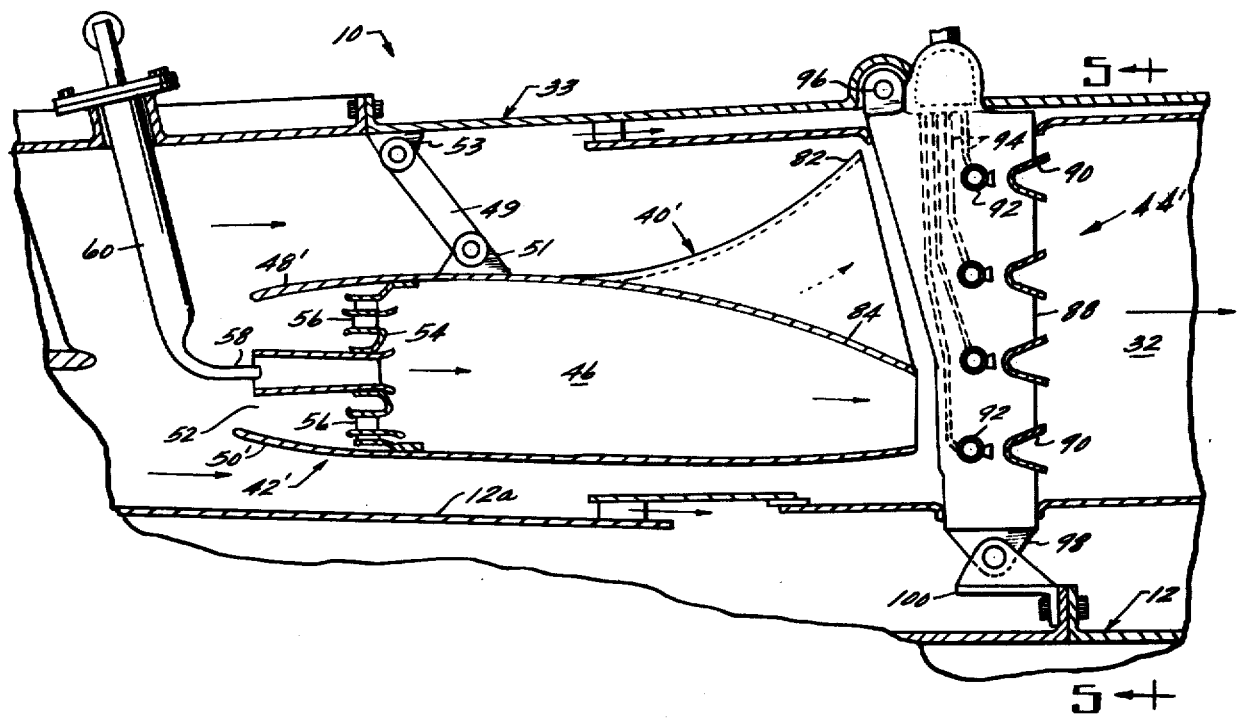
FIG. 4 is a cross-sectional view of a bypass gas turbine engine of the turbofan type having an alternate embodiment of the augmentation burner arrangement of this invention.

Referring to FIG. 1, a bypass gas turbine engine 10 of the turbofan type is illustrated as comprising an inner cylindrical casing 12 which encloses in flow series: a compressor section 14, a main combustor 16, duct means 18 extending from the combustor, a high pressure turbine section 20, a low pressure turbine section 22, and an exhaust nozzle means 24 which may be of the variable area type. This engine can be a conventional turbofan engine as is well known in the art. Compressor section 14 is drivably connected to the high pressure turbine 20 through an interconnecting shaft 26 and a forward fan section 28 is drivably connected to the low pressure turbine section 22 through another interconnecting shaft 30.

An annular bypass duct 32 is formed between the inner casing 12 and an outer casing or cowling 33 extending therearound and radially spaced apart therefrom. The outer casing 33 at its forward end encloses the forward fan section 28 and extends rearwardly terminating in a second exhaust nozzle 34 which may also be of the variable area type having a converging portion 36 together with a diverging portion 38. The fan section 28 receives air through an inlet 29 at the forward end of the outer casing 33 and thereafter delivers a portion of its air to the axial flow compressor section 14. The compressor section 14 in turn supplies its air to the main combustor 16 where heat is added to the air by burning fuel therein. From the combustion chamber the hot gases coact with the blades of the turbines 20, 22 and drive the turbines. The hot gases then discharge through the nozzle 24 defined by the rearward portion of the casing 12, whereby the engine 10 is provided with forward propulsive thrust.

A two-stage bypass augmentation burner 40, as best seen in FIG. 2, is stationed within the bypass duct 32 and provides additional thrust augmentation to the turbofan engine. The two-stage bypass augmentation burner 40 includes a primary or auxiliary burner 42 stationed upstream of a secondary burner 44. The primary burner 42 includes an annular combustion chamber 46 defined generally by an outer annular casing 48 spaced apart from and concentric to an inner annular casing 50 both of which together define an annular opening 52 at the upstream end thereof providing an inlet for the receipt of airflow exiting from the fan 28. Combustion chamber 46 is maintained in spaced apart relation within the bypass duct 32 by a plurality of circumferentially spaced apart interconnecting links 49 the inside ends of which are rotatably pinned to the casing 48 by clevises 51 and the outside ends of which are rotatably pinned to the cowling 33 by clevises 53. The upstream end of the combustion chamber 46 is defined by a transverse dome member 54 which includes a plurality of spaced apart inlet ports 56 for receiving the inlet airflow from the fan section 28. Fuel is delivered to the combustion chamber 46 from a plurality of fuel injectors 58 which are circumferentially spaced apart about the transverse dome member 54 and which receive an inlet flow fuel from a plurality of spaced apart fuel conduits 60 which connect to a source of pressurized fuel (not shown).

For reasons which will become more apparent from the following discussion, the downstream ends of the outer and inner casings 48 and 50 are corregated or convoluted in the manner of a daisy mixer to provide petal-like lobes having alternate respective crests 62, 62' and troughs 64, 64', as best shown in FIG. 3. It will be further appreciated that the troughs 64 of the outer casing 48 are generally provided in a radial alignment to the crest 62' of the inner casing 50. Between the crests 62 of the outer casing 48 and the troughs 64' of the inner casing 50, there are defined hot chutes 67 and 69 through which the greater portion of the hot gases of combustion from the auxiliary burner discharge. Interleaved between the hot chutes are a plurality of cold chutes 66, 68 which discharge fan airflow in circumferentially alternating relation to the discharged hot combustion gases.

The secondary burner 44 may include a plurality of spaced apart fuel injectors 72 each comprising a generally divergent hemospherical cup 74 having its open end facing in a downstream direction. A fuel passage 76 opens tangentially into the rear of each cup and a vortex is generated in the cup by fan airflow entering tangential slots 80 which are spaced apart around the cup. This aerial vortex may form a sheer plane which acts as a barrier to prevent the escape of fuel from the cup until it has been broken up and entrained within the vortex in the identical manner as disclosed in U.S. Pat. No. 3,720,058 which issued Mar. 13, 1973 and which is assigned to the instant assignee. The fuel injectors 72 receive an inlet flow of fuel from fuel tubes 78 which in turn connect to a source of pressurized fuel (not shown). During flight, when the turbofan engine 10 is advanced into the augmentation region of operation, fuel is initially introduced into the combustion chamber 46 of the primary burner 42, whereupon it is ignited by an igniter 81 provided in the combustion chamber for that purpose. The auxiliary burner 42 in turn ignites the fuel injected into the secondary burner 44 and improves the combustion efficiency of the secondary burner. The hot gases of the auxiliary burner 42 exit between the convoluted trailing edges of the outer and inner casings 48, 50 and impinge upon the fuel injectors 72 of the secondary burner 44, whereupon the hot gases are drawn through the tangential slots 80 thereby initiating and sustaining combustion within the main burner 44.

From a structural standpoint, it will be appreciated that the fuel injectors 72 are mounted on circumferentially spaced apart radial struts 70 which are secured to the outer casing 33 and extend inward therefrom into respective engagement at 73 with another plurality of circumferentially spaced apart struts 71. The struts 71 also extend in a generally radial direction between the inner and outer casings 12, 33 and are rotatably pinned thereto by respective clevises 75, 77. It can be readily seen that the injectors 72 are radially spaced apart in several circumferential rows about the struts 70 which also house the fuel tubes 78 for the delivery of a flow of pressurized fuel to the injectors. The radial struts 71 provide supporting structure for the inner casing 12 surrounding the core engine. Heretofore in turbofan engines employing a bypass augmentation burner it was difficult, if not impossible, to station supporting radial struts in the hot exhaust stream. This high heat often proved to be damaging to the supporting struts and considerably shortened their useful lifetime.

The primary burner and radial strut arrangement of this invention, however, overcomes this difficulty by locating the radial struts 70 and 71 immediately aft of the cold chutes 66, 68 of the primary burner 42 such that cold chute air from the forward fan section 28 impinges directly upon the radial struts 70 and 71 and thus operates to cool the radial struts. In this manner, support of the inner casing 12 of the core engine can be greatly improved with a substantial decrease in the overhanging moment provided by the rearwardly stationed radial support struts 71. In addition, the amplitude of the vibrations encountered within the core engine can also be greatly reduced by the downstream location of the radial support struts 71. It will be further appreciated that additional cooling is provided within the struts 70 by a flow of fuel through the fuel tubes 78.

Referring now to FIG. 4, where like numerals designate previously described elements, there can be seen an alternate arrangement for the augmented turbofan engine of this invention. A two-stage augmentation burner 40' having a primary or auxiliary burner 42' is again provided within the annular bypass duct 32 and includes an outer annular casing 48' spaced radially apart from an inner annular casing 50'. However, only the downstream end of the outer annular casing 48' is corregated or convoluted in the manner of a daisy mixer to provide petal-like lobes having alternate crests 82 and troughs 84. A plurality of circumferentially spaced apart cold chutes 86 for the receipt and discharge of a cooling airflow from the forward fan section 28 are defined by the spaces between the crests 82 and outward of the troughs 84 of the outer annular casing 48.

Downstream of the primary burner 42' there is again provided a secondary burner 44' comprising a plurality of radially spaced apart flame holding V-shaped gutters 90 in downstream fuel receiving relation to a plurality of radially and circumferentially spaced apart fuel injectors 92. The fuel injectors 92 are connected through a plurality of fuel tubes 94 to an appropriate source of fuel (not shown) which may even include a fuel control for metering the required amount of fuel to be supplied to the fuel injectors 92. The two-stage bypass augmentation burner 40' functions essentially in the same manner as previously described in relation to FIGS. 2 and 3. An inlet flow of fuel from the fuel injectors 58 to the primary burner 42' is initially ignited whereupon the hot gases are discharged from the primary burner and operate to ignite the fuel discharged from the fuel injectors 92 of the secondary burner 44', thereby sustaining and improving combustion within the secondary burner. The flameholding V-shaped gutters 90 function in a known manner by providing surfaces within the flow stream of the bypass duct 32 to which the main burner flame may attach. The fuel delivered to the injectors 92 through the tubes 94 may receive sufficient heat from the primary burner 42' exhaust to reach vaporizing temperature before discharge through the injectors 92. Thus the secondary burner 44' may be of the vaporizing type whereby the fuel is uniformly dispersed from the injectors 92 as a vapor. It should also be appreciated that for those instances when the augmentation burner is not in operation, the fuel lines to both the primary and secondary burners must be continually purged with low temperature and low pressure air in order to prevent coking within the fuel lines.

Again, structural support is provided between the outer casing 33 and the inner casing 12 of the core engine by a plurality of circumferentially spaced apart radial struts 88. The flameholding circumferential gutters 90, together with fuel injectors 92, are maintained in spaced apart relation within the bypass duct 32 by attachment to the radial struts 88 which extend from inner clevises 98 around a core engine support flange 100 radially outward to outer clevises 96 in attachment to the outer casing 33. Again, the radial struts 88 are located immediately aft of the cold chutes 86 so as to receive direct impingement of the cooling airflow from the forward fan section 28. In this manner, radial struts 88 may again be located downstream of the primary burner 42' with the major portion of the hot exhaust gas stream from the primary burner 42' discharging between the radial struts.

Figure 5:
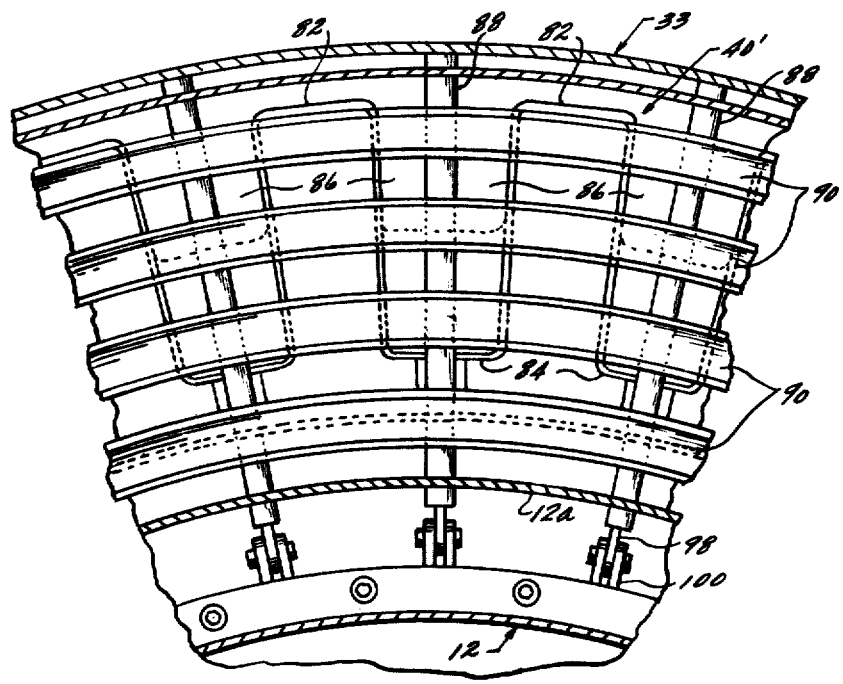
FIG. 5 is a cross-sectional view across the lines 5—5 of FIG. 4.

Although only the outer annular casing 48' of the primary burner 42' has been depicted and described in FIGS. 4 and 5 as terminating in a downstream convoluted edge, it will be readily understood that the inner annular casing 50' could also be the only casing terminating in a downstream convoluted edge. It will be appreciated that the secondary burners 44 and 44' may be used interchangeably with the primary burners 42, 42' or that the secondary burners 44, 44' may be eliminated entirely with thrust augmentation provided solely by the primary burners 42, 42'. As previously discussed, the bypass gas turbine engine need not be of the turbofan type and may alternatively have a bypass passageway where the airflow therethrough is ram induction air which is not charged by an upstream fan.

Thus having described the various preferred embodiments of the invention, though not exhaustive of all possible equivalents, what is desired to be secured by Letters Patent is claimed below.

What is claimed is:

1. A bypass gas turbine engine comprising:
an inner casing enclosing compressor means, combustion means and turbine means in serial flow relation;
an outer casing spaced apart from the inner casing defining a bypass duct therebetween;
a bypass augmentation burner stationed within the bypass duct for providing additional thrust augmentation to the gas turbine engine wherein the downstream end of the bypass burner is convoluted to define alternating hot and cold chutes, and
a plurality of spaced apart struts extending between the inner and outer casings so as to receive impingement of a cooling airflow directly from the plurality of cold chutes.

2. The bypass gas turbine engine of claim 1 wherein the bypass augmentation burner includes an annular combustion chamber defined generally by an outer annular burner casing spaced apart from and concentric to an inner annular burner casing, both of which together generally define an annular opening at the upstream end thereof for the receipt of an inlet airflow therethrough wherein the downstream ends of the outer and inner burner casings are corregated or convoluted in the manner of a daisy mixer to provide petal-like lobes having alternate respective crests and troughs and the troughs of the outer burner casing are provided in general radial alignment with the crests of the inner burner casing such that the areas between the crests of the outer burner casing and the troughs of the inner burner casing define the hot chutes through which the greater portion of the hot gases of combustion discharge with the cold chutes defined generally between the hot chutes for discharging a cooling airflow.

3. The bypass gas turbine engine of claim 2 wherein the outer casing encloses a fan section at its forward end.

4. The bypass gas turbine engine of claim 1 wherein the bypass augmentation burner includes an annular combustion chamber defined generally by an outer annular burner casing spaced apart from the concentric to an inner annular burner casing both of which together define an annular opening at the upstream end thereof for the receipt of an inlet airflow therethrough wherein the downstream end of the outer burner casing is corregated or convoluted in the manner of a daisy mixer to provide petal-like lobes having alternate crests and troughs and the spaces between the crests and outward of the troughs define the cold chutes while the spaces between the troughs and inward of the crests define the hot chutes through which the greater portion of the hot gases of combustion discharge.

5. The bypass gas turbine engine of claim 4 wherein the outer casing encloses a fan section at its forward end.

6. A bypass gas turbine engine comprising:
an inner casing enclosing compressor means, combustor means and turbine means in serial flow relation;
an outer casing spaced apart from the inner casing so as to define a bypass duct therebetween;
a two-stage bypass augmentation burner having a forward primary burner and an aft secondary burner stationed within the bypass duct for providing additional thrust augmentation to the gas turbine engine wherein the downstream end of the primary burner is convoluted to define alternating hot and cold chutes, and
a plurality of circumferentially spaced apart struts extending generally in a radial direction between the inner and outer casings so as to receive impingement of a cooling airflow directly from the plurality of cold chutes.

7. The bypass gas turbine engine of claim 6 wherein the primary burner includes an annular combustion chamber defined generally by an outer annular burner casing spaced apart and concentric to an inner annular burner casing, both of which together generally define an annular opening at the upstream end thereof for the receipt of an inlet airflow therethrough wherein the downstream ends of the outer and inner burner casings are corregated or convoluted in the manner of a daisy mixer to provide petal-like lobes having alternate respective crests and troughs and the troughs of the outer burner casing are provided in general radial alignment with the crests of the inner burner casing such that the areas between the crests of the outer burner casing and the troughs of the inner burner casings define the hot chutes through which the greater portion of the hot gases of combustion discharge with the cold chutes defined generally between the hot chutes for discharging a cooling airflow.

8. The bypass gas turbine engine of claim 7 wherein the secondary burner includes a plurality of spaced apart fuel injectors mounted to a second plurality of spaced apart struts secured to the outer casing and extending inwardly therefrom into respective engagement with the first plurality of struts whereby each fuel injector comprises a generally divergent hemospherical cup having its open end facing in a downstream direction with a fuel passage opening tangentially into the rear of each cup together with a plurality of tangential slots spaced apart around the cup such that a vortex is generated within each cup by the airflow entering the tangential slots wherein the vortex operates to disperse the fuel emanating from the fuel passage.

9. The bypass gas turbine engine of claim 8 wherein the outer casing encloses a fan section at its forward end.

10. The bypass gas turbine engine of claim 6 wherein the primary burner includes an annular combustion chamber defined generally by an outer annular burner casing spaced apart from and concentric to an inner annular burner casing both of which together generally define an annular opening at the upstream end thereof for the receipt of an inlet airflow therethrough wherein the downstream end of the outer burner casing is corregated or convoluted in the manner of a daisy mixer to provide petal-like lobes having alternate crests and troughs and the spaces between the crests and outward of the troughs define the cold chutes while the spaces between the troughs and inward of the crests define the hot chutes through which the greater portion of the hot gases of combustion discharge.

11. The bypass gas turbine engine of claim 10 wherein the secondary burner includes a plurality of radially spaced apart flame holding V-shaped gutters in downstream fuel receiving relation to a plurality of radially and circumferentially spaced apart fuel injectors.

12. The bypass gas turbine engine of claim 11 wherein the outer casing encloses a fan section at its forward end.

* * * * *